Figure 1:
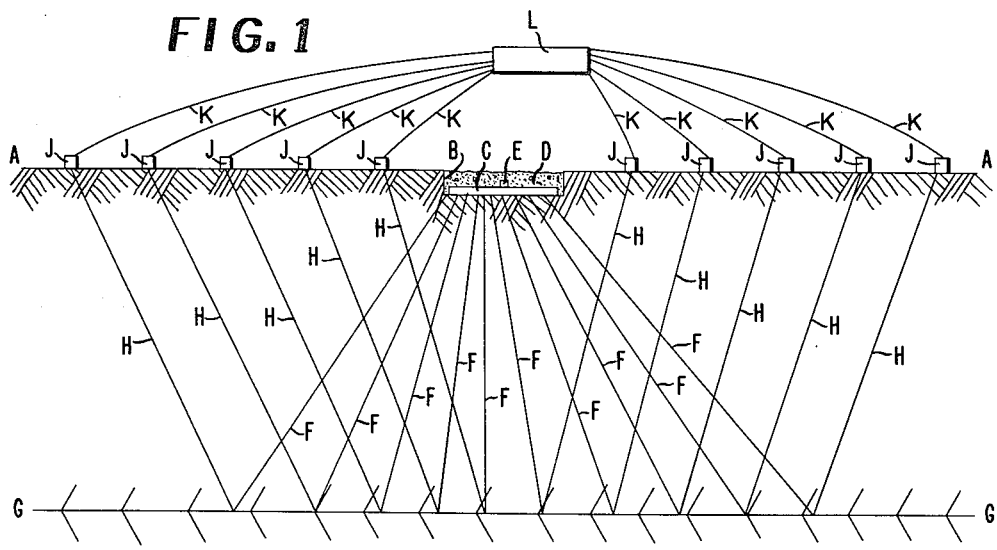

Nov. 21, 1961  A. B. ANDREWS ET AL  3,009,526
SEISMIC PROSPECTING ASSEMBLY
Filed June 27, 1958  2 Sheets-Sheet 2

INVENTORS
ALDAY BISHOP ANDREWS
FRANK ABRAHAM LOVING, JR

BY *Thos. A. Wilson*
ATTORNEY

United States Patent Office 3,009,526
Patented Nov. 21, 1961

3,009,526
SEISMIC PROSPECTING ASSEMBLY
Alday Bishop Andrews, Woodbury, and Frank Abraham Loving, Jr., Wenonah, N.J., assignors to E. I. du Pont de Nemours and Company, Wilmington, Del., a corporation of Delaware
Filed June 27, 1958, Ser. No. 745,026
1 Claim. (Cl. 181—.5)

The present invention relates to a novel geophysical exploration assembly. More particularly, the present invention relates to a seismic prospecting assembly whereby the geologic structure of the earth, on land and in "off-shore" locations, may be surveyed accurately and readily.

In seismic prospecting, which is commonly employed to discover the location of oil or other mineral deposits, energy, usually generated by the detonation of an explosive charge, is introduced into the earth, and waves, similar to sound waves, are initiated. These waves are returned to the surface by reflection or refraction from subsurface interfaces and are picked up on the surface by sensitive detectors, geophones, which translate the vibrations into electrical impulses which are amplified and recorded on a seismograph. The intervals required for the waves to travel to the reflecting or refracting surfaces and back to the detectors at various points on the surface are indicative of the depth and structure of the interfaces.

In attempts to facilitate operations and/or to obtain maximum seismic return, a number of procedures have been employed for the introduction of the explosion energy into the earth. The detonation of conventional explosive charges on the surface of the earth is an impractical source of seismic energy, because a substantial portion of the energy thereby released is lost to the air due to poor coupling of the energy from the charge with the ground. Moreover, an excessive depth of cover would have to be provided over such conventional charges to muffle the resultant air blast, which is not only an annoyance but also a hazard.

Therefore, to provide better coupling and to eliminate air blast, the charges generally are detonated in shot holes drilled in the desired pattern in the earth. In conventional seismic prospecting operations, the shot holes are drilled to a point below the weathered layer of the earth, the positioning of the charges below this layer and in consolidated rock being considered necessary to the obtaining of good seismic records. Thereby, the shot holes vary in depth from a few feet to several hundred feet. The time, equipment, and personnel required to drill these shot holes naturally increases the cost of the total operation. In fact, several authorities have estimated that the expense of drilling averages about 20% to 50% or more of the total cost of the seismic exploration. Additionally, in certain regions which must be subjected to seismic surveying, the nature of the terrain is such that drilling is almost impossible, for example in marshy ground, or the transportation of the necessary equipment poses such problems as to negate the feasibility of drilling, for example in certain foreign fields. Another disadvantageous feature resulting from the detonation of the charges in shot holes is the phenomenon termed "ghosting." When the charge is fired in shot holes, a certain portion of energy therefrom travels in an upward direction and is reflected or refracted downward upon arrival at the surface of the ground and/or the interface between the consolidated rock stratum and the weathered layer. Thereafter, the reflected or refracted energy follows behind the useful seismic energy and is received by the geophones to be recorded as "ghosts" which interfere with the interpretation of the normal seismic records. Moreover, in some instances it is desirable to make a number of shots at the same point in or on the earth. Inasmuch as the section of the shot hole used previously is closed off by debris from the blast, the shot hole procedure is unsuited for this type of exploration.

Because of the inconveniences and expense inherent to the provision of shot holes, recourse has been made to a more recently developed procedure for the introduction of the explosion energy into the earth. In this method, the so-called "air blast" method, the charges are not fired in shot holes in the earth strata but are fired simultaneously in arrays of equidistant cylindrical charges maintained, for example on poles, above the earth's surface. This method automatically eliminates the necessity for shot holes and also the phenomenon of "ghosting." Other advantages of this "air blast" method are stated to be that a plane detonation front is produced which is not attenuated with distance by spreading out as does the normal spherical detonation front and that the energy which strikes the ground over a wide area is not dissipated by the crushing of rock as occurs in a shot hole. However, a substantial portion of the energy is lost in the "air-blast" method by reflection upward from the surface of the earth, giving rise to controversy concerning the efficiency of the method in comparison with the shot hole method. Another disadvantage of this above ground method resides in the fact that the intense air blast from the explosion constitutes not only a hazard which must be dealt with by the use of extensive and costly safety precautions but also a source of complaints based upon actual damage and psychological factors. The intense shock wave from the air blast actually can effect the breakage of windows and other structural failures in buildings and dwellings in the immediate vicinity, which damage must be compensated for by the exploration company.

A more serious consequence of the air blast is the fact that the noise of the detonation is highly objectionable. The actual sound level in decibels measured at the point of complaint usually is not excessively high. However, the nature of the sound wave associated with the explosion, i.e., the pulse of maximum intensity is the first sound pulse reaching the listener, is psychologically unpleasing. Although the sharp crack of the explosion may be rapidly attenuated to a rumble, the listener nevertheless is startled by the sound even though the actual sound level is no more than that frequently found in home and factory. In many instances in farming areas, complaints have been registered that the blast noise has had adverse effects upon livestock, which complaints have resulted in suspension of operations and, at times, law suits. Because of the psychological connotations of this complaint, whether actual or imaginary, it is more difficult to deal with than those arising from actual damage. Therefore, because of the complaints attendant to the "air blast" method and in view of the controversial opinions as to its efficiency, the use of the shot hole method, although it requires expensive drilling, is preferred in many instances, especially in well populated or farming areas.

Obviously, a need exists for a seismic prospecting method free of the afore-outlined drawbacks of the prior art methods.

The previous discussion has pertained to seismic explorations conducted on land. However, consideration must also be given to "off-shore" seismic prospecting. In "off-shore" operations, the charge is suspended a few feet below the surface of the water, and the energy generated by the detonation of the charge must travel through the remainder of the water to the ocean bottom and thence through the strata therebelow. As the energy traverses the distance between its source and the ocean floor, a considerable portion of the energy is lost by absorption in the water. Although the positioning of the charge on the ocean floor theoretically would provide maximum seismic return from the generated energy because the absorption of energy could thus be avoided to a substantial degree, in practice this theoretical procedure cannot be used with conventional explosive charges because of the phenomenon called the "bubble pulse." This bubble pulse consists of the oscillations, i.e. alternating expansions and contractions, of the gas bubble liberated in the water by detonation of the charge. These oscillations, which are recorded on the seismogram as successive pressure pulses, obscure the seismic pulses at times to the extent of making the records useless. However, when the charge is suspended only a few feet below the water's surface, the gas bubble breaks the surface on its first expansion, permitting the obtaining of useful records. The maximum depth, $d$, at which conventional charges may be suspended in the water depends upon their weight, $w$, as given in the following equation:

$$d = 3.8 w^{1/3}$$

For a charge having a weight of 20 pounds, a weight of explosive commonly used in off-shore operations, the depth at which it is suspended is at most about 10 feet. For a 50-pound charge, the maximum depth is about 14 feet. Since the waters in which these "off-shore" explorations are conducted frequently are several hundred feet in depth, it is apparent that the energy must often travel through several hundred feet of water before that portion of the energy which is not dissipated is introduced into the underwater formations. Obviously, a need exists for an "off-shore" seismic exploration method which essentially obviates this loss of energy to the water without giving rise to undesirable bubble pulse traces.

Accordingly, an object of the present invention is the provision of a seismic prospecting assembly which is not dependent upon the use of shot holes, the drilling of which constitutes a substantial portion of the costs of the operation. Another object of the present invention is the provision of a seismic prospecting assembly which is free of the hazards and annoyances of "air blast" seismic prospecting. A further object of the present invention is the provision of an assembly for seismic prospecting which does not produce extraneous and deleterious "ghost" traces and by which a plurality of shots may be made at the same point on the earth's surface. A still further object of the present invention is the provision of an "off-shore" seismic prospecting assembly whereby maximum seismic return is obtained from the energy generated by the explosion. Other objects will become apparent as the invention is further described.

We have found that the foregoing objects may be achieved when we provide a seismic prospecting assembly comprising at least one sheet-like charge of a detonating explosive positioned on and parallel with the surface of the earth, either on land or under-water, the explosive charge being provided with initiation means and being covered with a layer of muffling material, and an array of geophones in detecting position.

In accordance with the method of the present invention, at least one sheet-like charge of a detonating explosive provided with suitable initiation means is positioned on and parallel with the surface of the earth, a sufficient layer of muffling material is provided on the charge, a plurality of geophones are arrayed in detecting position, and the sheet-like charge is initiated, the seismic pulses being recorded in the conventional manner. Naturally, in "off-shore" operations the sheet-like charge or charges are suitably weighted and allowed to sink to lie flat on the ocean floor, the water above the floor and the charge acting as the muffling material. The dimensions of the charge are such that the ratio of the weight of the explosive in pounds to the area of the charge in square feet is at most 2 to 1. The term "area of the charge" as used in the specification and claim refers to the effective area, i.e., the area of a surface which would be covered by the charge.

Figure 2:
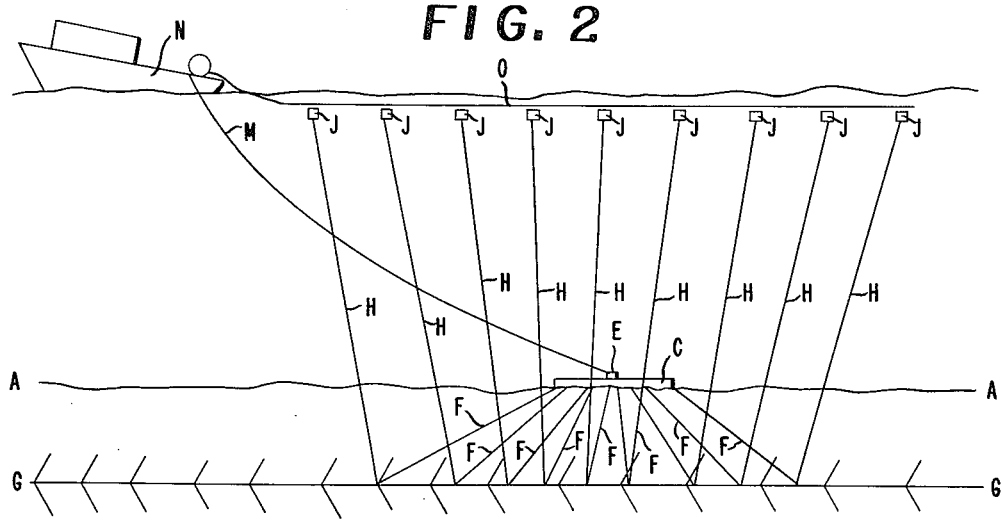
Figure 3:
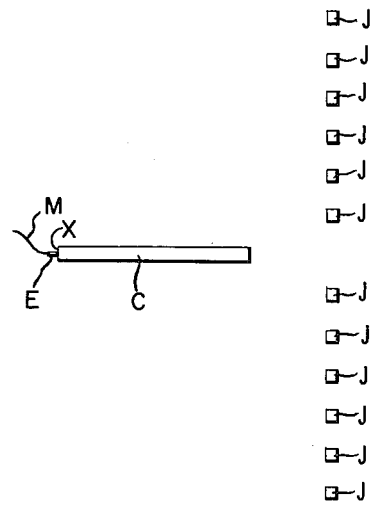
Figure 4:
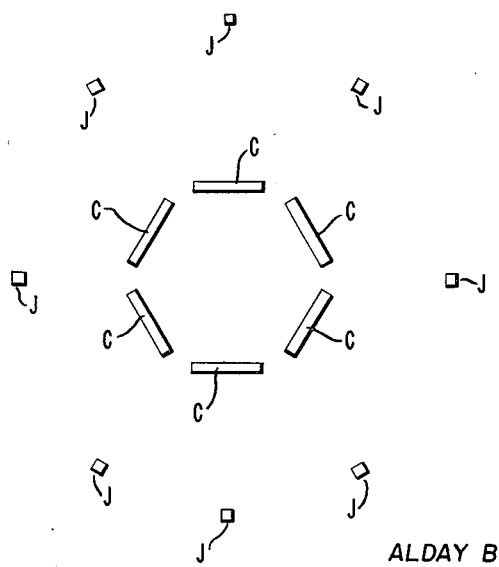

In order to describe more completely the nature of the present invention, reference is made to the accompanying drawings in which:

FIGURE 1 represents a side view partially in section of the assembly of the present invention as it would be used for "on land" seismic prospecting, FIGURE 2 represents a side view partially in section of the present seismic prospecting assembly used in "off-shore" locations, FIGURE 3 illustrates in top view and in simplified form the seismic prospecting assembly of the present invention as used in a specific type of seismic operation, and FIGURE 4 illustrates in top view and in simplified form the present assembly as used in one type of pattern shooting.

In all figures, identical features are indicated by the same symbol. Referring now to the figures in greater detail, specifically to FIGURE 1, line A—A represents the surface of the earth and B the walls of a shallow trench dug in the earth's surface. An elongated sheet-like charge C of detonating explosive is disposed so that it lies flat on the bottom of the trench, and the earth removed in digging the trench is loosely piled on top of charge C to constitute the layer of muffling material D. Upon actuation of initiation means E, the charge C detonates and seismic waves indicated by lines F are generated. Upon arrival at the reflecting interface G—G, the waves F are reflected back as indicated by lines H to the surface A—A where they are picked up by the geophones J and transmitted along wires K to the recorder L.

In FIGURE 2, A—A again represents the surface of the earth, that is the ocean floor, G—G the reflecting interface, F the seismic waves generated, and H the reflected waves. In this underwater work, the charge C is weighted so that it sinks readily through the water and lies flat upon the ocean bottom A—A, the superincumbent water on the charge naturally acting as the muffling layer. The detonation of charge C is effected by actuation of initiation means E, specifically an electric blasting cap, the lead wires M of which are attached to a power source on boat N. Geophones J are suspended slightly below the surface of the water by line O attached to boat N, the recording means not being shown for simplicity.

In FIGURE 3, the assembly of the present invention is shown as it would be set up in one form of "directional" shooting, a method used particularly in areas which are difficult to survey or which contain certain irregularities such as "dipping beds," that is, adjacent strata having interfaces which are not horizontal. In "directional" shooting generally, the geometry of the geophone array and explosive charge or charges is so selected as to permit the directing, or "beaming," of the energy with resultant improved seismic return from the given formation. In the case illustrated in FIGURE 3, charge C is laid out on the surface of the ground at a right angle to the straight-line array of geophones J and is initiated at the end X farther from the geophones by electric blasting cap E, the conducting wires of which are indicated by M. The layer of muffling material which would be provided over charge C in actual operations and the recording means are not shown in the interests of simplicity.

In FIGURE 4, C again represents the explosive charge and J the geophone, this drawing illustrating in schematic form the assembly of the present invention as adapted for use in one form of pattern shooting. In this pattern, a number of elongated sheet-like charges C are arranged to form a hexagon and geophones J are arranged in a circle around the charges and at a suitable distance from them. Again, the muffling layer and recording mechanism are not shown, nor are the initiation means, for the sake of simplification.

The following examples serve to illustrate specific embodiments of the assembly of the present invention. However, they will be understood to be illustrative only and not as limiting the invention in any manner. The exemplified tests were all conducted in actual exploration areas by seismic prospecting crews. The specific sheet-like explosive used in the tests comprises a crystalline cap-sensitive, high-explosive, i.e., PETN, bound by a mixture of an elastomer and a terpene hydrocarbon resin. This explosive is described in detail in copending application Serial No. 666,221, filed June 17, 1957, now abandoned by C. J. Breza and C. O. Davis and assigned to the present assignee.

*Example 1*

The hereinafter described test was made to compare the results obtained by using sheet-like explosive in accordance with the method of the present invention with those obtained by using conventional seismic charges in like manner. In this test, three 10-pound charges were used: (1) two 5-pound cartridges (each 24 inches in length x 2¼ inches in diameter) of a conventional seismograph explosive, the charge having a weight to effective area ratio of about 6 pound per square foot, (2) an 8-square foot charge of a sheet explosive having a weight to effective area ratio of about 1.25 pounds per square foot, and (3) a 16-square foot charge of the sheet explosive having a weight to effective area ratio of about 0.63 pound per square foot. All charges were laid flat on the ground and covered with a layer of loosely piled earth. About 2 feet of earth was provided over all three charges. Observations of the three blasts indicated that the noise produced by charge 1 was of a considerably greater level than that produced by charge 2 or charge 3. Investigation of the records from each blast showed that more seismic energy was obtained from the sheet explosive charges than from the conventional charge, the highest energy being obtained from the sheet explosive having the larger area (charge 3).

*Example 2*

Two comparative shots were made, in one of which 360 pounds of conventional seismic dynamite was distributed in 36 shot holes and in the other of which a 320-pound strip of sheet explosive was laid flat on the ground. In the first case, a 10-pound charge was placed in each of the 36 shot holes drilled in a conventional pattern. In the second case, the sheet explosive was in the form of a strip 10 inches wide by 310 feet long by about 3/16 inch in thickness and had an explosive loading of 1.25 pounds per square foot. The strip was laid on the bottom of a shallow trench dug by means of a bulldozer and was covered to the depth of about 30 inches with the earth removed in the digging of the trench, the cover amounting to 250 pounds of earth per square foot of charge. The seismic records obtained in both blasts were essentially equivalent.

*Example 3*

In order to determine the suitability of the present assembly and method for directional shooting, two shots were made with 10-inch-wide x 200-foot-long strips of the sheet explosive laid on the surface of the ground and covered with an adequate amount of muffling material, i.e. earth. The strips were provided with a cover of waxed paper to decrease handling hazards due to impact and friction. In one shot, no attempt was made to direct the energy and the strip was laid parallel to the geophone spread. In the other shot set up as shown in FIGURE 3, the strip was laid at a right angle to the geophone spread and was initiated at the end farther from the geophones. Much more energy was received by the geophones in the latter case, indicating that considerable directivity is obtained by proper choice of charge and geophone geometry and point of initiation in the assembly and method of the present invention.

*Example 4*

In an "off-shore" trial, a four-foot-square sheet of the explosive was weighted and allowed to sink so that it came to rest flat on the ocean floor. The sheet which had an explosive loading of 1.25 pounds per square foot and weighed 20 pounds was centrally initiated by an electric blasting cap. Examination of the records obtained in this shot showed that more than the customary seismic return was obtained and that no noticeable bubble pulse was produced.

As is apparent from the foregoing examples, improved results are obtainable in seismic exploration on land and in "off-shore" locations by use of the assembly of the present invention. Although we do not wish to be limited by a theoretical discussion of the functioning of the present invention we believe that the increased area of the sheet-like charge used in our invention in comparison to conventional charges results in better coupling of the energy with the earth and that because of the large surface area to volume ratio of the charge a larger proportion of the total energy is radiated as compression energy. As a result, an increased proportion of the energy is introduced into the earth, giving rise to improved seismic return and lessening of the air blast. This theory is substantiated to a great extent by the results given in Example 1 which show that as the charge area is increased for a given weight of explosive, the seismic return is increased. Because of the large area of the charge with respect to explosive weight, the surface below it is not substantially damaged by the blast, and thus, a number of shots may be made at the same point on the earth's surface. With respect to the absence of bubble pulse when the sheet charge is used under water, we believe that this charge, due to its large area, produces initially a sheet-like bubble which collapses through turbulent action to produce a number of small gas bubbles, these small bubbles having varying size and rates of pulsation so that their oscillations do not interfere with the seismic records.

The critical features of the present invention are (1) that the charge must be laid flat on the earth, i.e., parallel to the surface of the earth, (2) that it must be sheet-like in form, and (3) that the charge must be provided with a sufficient cover of a muffling material.

With respect to requirement 1, the charge may simply be placed on the natural surface of the earth so that it lies parallel to the earth or the charge may be placed in a shallow trench in the earth's surface when excavation of the earth is desired to provide the muffling material or when the natural surface of the earth is very irregular. Short, shallow trenches of course may be dug manually, longer trenches being readily provided by means of a bulldozer or the like. Naturally, either of the two alternative positioning methods may be used without influencing the results obtained, the exact method used being dependent upon such extraneous factors as the nature of the terrain, availability of muffling material, and availability of equipment. To position the charge on the ocean floor, the charge is weighted in a manner such that it will sink readily to lie flat on the ocean floor and then is dropped into the water.

As afore-mentioned, the charge must be sheet-like in form, that is its area must be large in comparison with its thickness. For ease of definition and selection of charge configuration, we may state that the area and weight of the charge are so related that its weight in pounds is at most two times its effective area, as previously defined, in square feet. That is, a charge having a weight of two pounds must have an area of at least one square foot and one having a weight of 150 pounds must have an area of at least 75 square feet. In general, it is immaterial whether or not the charge is square or elongated in appearance, the exact configuration being chosen on the basis of such factors as use in directional shooting, the pattern used if pattern shooting is desired, and so forth.

To provide better coupling and minimize air blast, the charge is covered with a layer of muffling material. A wide variety of substances may be used as the muffling material, the exact material used not being critical. Such materials include earth, sand, gravel, cinders, water and so on. On a practical basis, economic factors, ease of handling, and availability in most cases will dictate the material selected. For example, the cheapest available material, which will usually be earth, generally will be chosen. Naturally, in underwater work, no additional muffling material need be supplied, inasmuch as the water above the charge forms an excellent muffling material. In fact, in some cases, water probably will be used for various reasons when the seismic prospecting will be carried out on land. Very light materials, such as those having a density less than water, probably will be discriminated against because the volume of such materials required to supply the necessary weight of cover normally will be excessive.

The amount of muffling material used is a function of the charge weight. We have found experimentally that the minimum cover necessary is 74 pounds per pound of explosive. In laboratory-scale tests, a tentative subjective scale for degree of muffling was established, wherein the value 1 was assigned to indicate a well-muffled shot and 5 to indicate a loud crack, ratings of 2½ or less being judged satisfactory noise levels. In these tests, 2-foot-square sheets of the exemplified explosive having loadings of 0.63 pound and 1.25 pound per square foot were laid flat on the ground and an electric blasting cap was positioned at the center of the sheet. Then, the assembly was covered with sandy soil having a density of 1.5 grams per cubic centimeter. The charge was initiated and the noise levels determined subjectively. The results were:

| Shot No. | Sheet Explosive Loading (lb./sq. ft.) | Total Wt. of Explosive (lb.) | Cover Depth (in.) | Cover Wt. (lb.) | Wt. Cover/lb. Explosive (lbs.) | Noise Value [1] |
|---|---|---|---|---|---|---|
| 1 | 0.63 | 2.52 | none | | | 5, 5 |
| 2 | 0.63 | 2.52 | 6 | 187 | 74 | 1½ to 2, 3 |
| 3 | 0.63 | 2.52 | 12 | 374 | 148 | 1, 1 |
| 4 | 1.25 | 5.0 | 12 | 374 | 74 | 2, 2½ |
| 5 | 1.25 | 5.0 | 24 | 749 | 149 | 1, 1½ |

[1] As detd. by 2 independent observers.

Direct-measurement tests also were made seventy-five feet from the charges to verify the subjective tests. In these tests, decibel levels and pressure were determined by use of a microphone, the reference being $2 \times 10^{-4}$ microbars. In a shot made with no cover, the values were 170 decibels and 1 pound per square inch pressure. The decibels rating of the shock wave seventy-five feet from the charge is considered to be about 150 decibels. When the sheet explosive charge was covered with about 74 pounds of earth per pound of explosive, the decibels rating was 140 decibels, a value below the shock wave range, and the pressure was 0.03 pound per square inch. Thus, the provision of muffling material in the amount of 74 pounds per pound of explosive diminishes the loudness of the sound and also the pressure to acceptable levels.

Therefore, for a charge weighing one pound and having an area of one square foot, at least 74 pounds of muffling material will be distributed over the charge. A one-pound charge having an area of two square feet will require at least 37 pounds per square foot of material distributed over the charge, and a two-pound charge having an area of one square foot will require 148 pounds of muffling material. When the material used is earth having a density of approximately 1.5 gram per cubic centimeter, or 93.6 pounds per cubic foot, the one-pound-per-square foot charge will require an essentially uniform cover of about at least 0.8 cubic foot, a depth of 9 inches of earth. The charge of larger area but equal weight will be covered with at least about 0.8 cubic foot, a depth of about 5 inches, of earth. The third charge (2 pounds per square foot) will require at least about 1.6 cubic foot, a depth of about 19 inches, of earth cover.

The exact explosive composition used in the assembly of the present invention is not critical so long as the explosive charge is of sheet-like configuration and is detonable. As afore-mentioned, the explosive composition of a copending application was used, because this composition which is self-supporting is easily handled and is of essentially uniform density. This composition contains a crystalline cap-sensitive high-explosive, such as PETN, RDX, or the lke, bound by a mixture of 75–25% of an elastomer and 25–75% of a thermoplastic terpene hydrocarbon resin, the high explosive constituting 77.5–92.5% of the total weight of the mixture. By variations in these proportions, compositions of various weights per unit area may be prepared. In addition to the exemplified composition, however, a wide variety of detonating explosive compositions can be used, the only restriction being that they are capable of being formed into the necessary sheets. Such compositions include plastic explosives such as those based on nitroglycerin and also granular materials maintained with a container or wrapper of the proper form. As exemplified, the self-supporting composition may be covered with a protective wrapper of waxed paper or the like to eliminate the hazards of impact or friction sensitivity without adverse effect. Drop test results (20 trials, 5-kilogram weight) on the 1.25-pound-per-square foot charge in the presence of grit indicate that the 50% detonations point is 9 inches when the charge is uncovered, whereas no detonations occurred at 56 inches when the charge was covered with the waxed paper. Although the use of other protective covering materials is feasible, the waxed paper is preferred because the wax lubricates any particles of grit present, eliminating hot spots.

The assembly of the present invention may be used in single-patch, pattern, strip, or directional shooting or combinations thereof. As is well known, the position of the detectors with respect to the explosive charges and the lay out of the charges are governed by numerous factors including economics, the nature of the terrain, the nature of the strata to be surveyed, the purpose of the shooting, availability and nature of facilities, and the like. In addition to the arrangements exemplified for pattern and directional shooting, many other arrangements conventional or otherwise may be employed, in which arrangements one or a plurality of muffled sheet-like charges are used.

The initiation means used is not critical. Generally, electric blasting caps of the proper strength, alone or in combination with a primer charge, are most readily employed and normally are necessities in "off-shore" operations. However, other initiation means may be substituted especially in operations effected on land.

The invention has been described in detail in the foregoing. However, it will be apparent to those skilled in the art that many variations are possible without departure from the scope of the invention. We intend, therefore, to be limited only by the following claim.

We claim:

A seismic prospecting assembly comprising a rectangular, elongated, sheet-like explosive charge comprising a self-supporting, deformable composition consisting of 92.5–77.5% of a cap-sensitive crystalline high explosive admixed with 7.5–22.5% of a binding agent comprising 25–75% of an elastomer and 75–25% of a thermoplastic terpene hydrocarbon resin, said sheet-like charge weighing up to 2 pounds per square foot, and being positioned parallel with the surface of the earth and covered with at least 74 pounds of muffling material per pound of said charge; an initiation means in initiating relationship with said charge at one end X thereof; and offset from the opposite end of said charge an array of geophones in detecting position in a straight line perpendicular to the longitudinal axis of said charge.

References Cited in the file of this patent

UNITED STATES PATENTS

| | | |
|---|---|---|
| 1,310,466 | Becket | July 22, 1919 |
| 2,133,484 | Sherar | Oct. 18, 1938 |
| 2,168,030 | Holmes | Aug. 1, 1939 |
| 2,340,314 | Farnham | Feb. 1, 1944 |
| 2,353,484 | Merten et al. | July 11, 1944 |
| 2,377,903 | Rieber | June 12, 1945 |
| 2,590,530 | Groenendyke | Mar. 25, 1952 |
| 2,693,245 | Hawkins | Nov. 2, 1954 |
| 2,774,306 | MacLeod | Dec. 18, 1956 |
| 2,810,444 | Dyk et al. | Oct. 22, 1957 |